(12) United States Patent
LaLone

(10) Patent No.: US 11,953,092 B2
(45) Date of Patent: Apr. 9, 2024

(54) VEHICLE TRANSMISSION SHIFT SHAFT BUSHING ASSEMBLY

(71) Applicant: Sonnax Transmission Company, Bellows Falls, VT (US)

(72) Inventor: Dylan Sebastian LaLone, Dummerston, VT (US)

(73) Assignee: Sonnax Transmission Company, Bellows Falls, VT (US)

( * ) Notice: Subject to any disclaimer, the term of this patent is extended or adjusted under 35 U.S.C. 154(b) by 177 days.

(21) Appl. No.: 17/406,610

(22) Filed: Aug. 19, 2021

(65) Prior Publication Data

US 2022/0090628 A1   Mar. 24, 2022

Related U.S. Application Data

(60) Provisional application No. 63/082,891, filed on Sep. 24, 2020.

(51) Int. Cl.
| | | |
|---|---|---|
| *F16C 33/74* | (2006.01) | |
| *F16C 17/10* | (2006.01) | |
| *F16C 33/20* | (2006.01) | |
| *F16F 1/36* | (2006.01) | |
| *F16H 61/00* | (2006.01) | |
| *F16H 63/30* | (2006.01) | |
| *F16C 33/04* | (2006.01) | |

(52) U.S. Cl.
CPC ............. *F16H 63/30* (2013.01); *F16C 17/10* (2013.01); *F16C 33/20* (2013.01); *F16C 33/74* (2013.01); *F16F 1/36* (2013.01); *F16H 61/0003* (2013.01); *F16C 33/046* (2013.01); *F16C 2361/65* (2013.01); *F16H 2063/3076* (2013.01)

(58) Field of Classification Search
CPC ................. F16H 61/0003; F16H 63/30; F16H 2063/3076; F16C 33/20; F16C 33/74; F16C 17/10; F16C 33/046; F16C 2361/65; F16F 1/36
See application file for complete search history.

(56) References Cited

U.S. PATENT DOCUMENTS

| | | | | |
|---|---|---|---|---|
| 3,854,733 A | * | 12/1974 | Wilson | F16J 15/32 277/553 |
| 5,060,765 A | * | 10/1991 | Meyer | F16D 65/18 188/71.9 |
| 10,508,701 B2 | * | 12/2019 | Cerri, III | B60G 7/008 |
| 2005/0072259 A1 | * | 4/2005 | Kim | F16H 61/36 74/473.1 |

FOREIGN PATENT DOCUMENTS

JP         2004-28282     *  1/2004

* cited by examiner

*Primary Examiner* — William C Joyce
(74) *Attorney, Agent, or Firm* — Andrus Intellectual Property Law, LLP

(57) ABSTRACT

A bushing assembly is configured for a vehicle transmission shift shaft, the shift shaft having a first diameter, a shift lever fixedly mounted to an end thereof, and a step defining a second diameter smaller than the first diameter along a length thereof. The bushing assembly includes a seal, a spacer, such as a spacer sleeve, and a bushing. The seal is positioned on the shaft abutting the shift lever, the spacer is positioned on the shaft abutting the seal, and the bushing is positioned over the spacer. A kit for replacement of an OE bushing and a method to replace a bushing are also disclosed.

11 Claims, 9 Drawing Sheets

Bushing splits down the middle, creating path for water and dirt to enter transmission

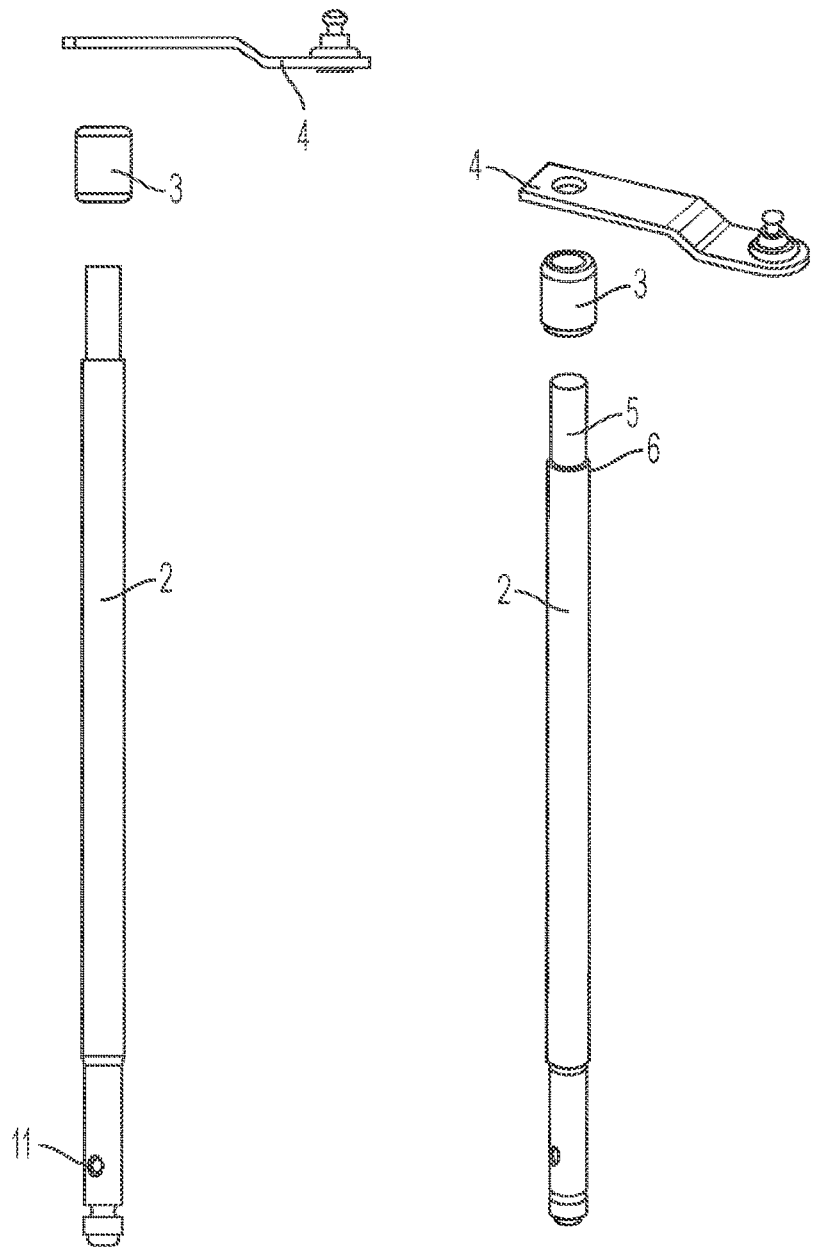

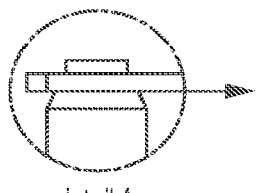
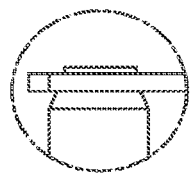
detail A  detail A
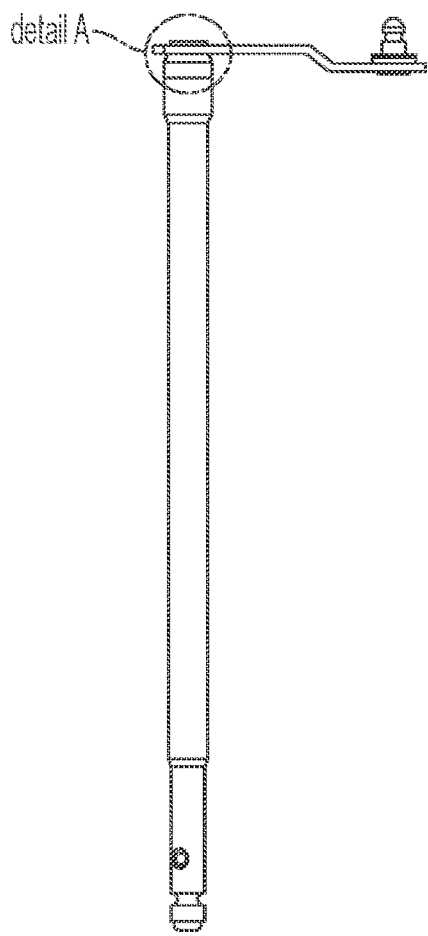
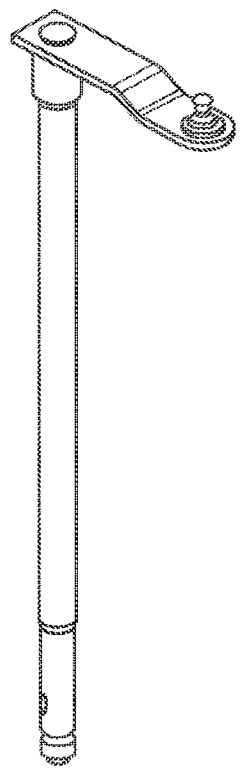
FIG. 2E
PRIOR ART
FIG. 2F
PRIOR ART

VEHICLE TRANSMISSION SHIFT SHAFT BUSHING ASSEMBLY

CROSS-REFERENCE TO RELATED APPLICATION DATA

This application claims the benefit of and priority to Provisional U.S. Patent Application Ser. No. 63/082,891, filed Sep. 24, 2020, titled VEHICLE TRANSMISSION SHIFT SHAFT BUSHING ASSEMBLY, the disclosure of which is incorporated herein in its entirety.

BACKGROUND

The present disclosure relates to a vehicle transmission shift shaft bushing, and more particularly to a bushing assembly for a vehicle transmission shift shaft.

A vehicle transmission shift shaft transmits the driver's mechanical input at the gear selector to a manual valve within the transmission's valve body. The manual valve is the input to the hydraulic control of the transmission's operation. Referring to FIGS. 1 and 2A-2H, the shift shaft assembly 1 includes a shaft 2, a nylon case bushing 3, and a shift lever 4. The shift lever 4 is permanently attached to an external end of the shift shaft 2 by, for example, peening. A gear selector S in the vehicle cabin connects to the shift lever 4 by a gear selector linkage L. The nylon case bushing 3 is installed around a portion 5 of the shaft 2 having a reduced diameter, and is retained on the shaft 2 by the shift lever 4 secured against a step 6 on the shaft 2.

The nylon case bushing 3 rides in a bore 7 in the transmission case 8, through which the shaft assembly is installed. A double lipped seal 9 installed in a counter bore 10 on the exterior of the transmission case 8 seals around the outer diameter of the nylon case bushing 3. The shaft 2 has a through hole at its internal end 11 that keys into the manual valve (not shown). The orientation of the shift shaft assembly controls the position of the manual valve.

The bushing is typically made of nylon, a commonly used material inside of automatic transmissions. The bushing is partially exposed above the case seal, which is located on top of the transmission. Nylon is well suited to absorb water from the environs, however water absorption greatly reduces the strength of the material and increases volume, thus resulting in swelling, which can compromise the integrity of the bushing.

The bushing is press fit onto the shift shaft and relies on an interference fit to maintain a seal for the assembly. As such, the potentially compromised bushing can yield to the stresses of this fit. It has been observed that the nylon bushing can split, bypassing the double lipped case seal to allow automatic transmission fluid to exit (leak) and moisture to enter the transmission.

To replace the bushing, the shift lever must be machined off of the shaft and welded back on while maintaining the exact orientation of the shaft through hole and the shift lever. As such, replacing the bushing is time consuming and may result in damage to a newly replaced bushing.

Accordingly, there is a need for a readily replaced transmission shift shaft bushing. Desirably, such a bushing can be replaced without removing the shift lever, thus reducing the time need to make the replacement and reducing the potential for damage of the newly replaced bushing. More desirably still, such a bushing can be installed onto a shaft, without concern for misorienting the shaft through hole.

SUMMARY

In one aspect of the present disclosure, a bushing assembly is configured for a vehicle transmission shift shaft, which shift shaft has a first diameter, a shift lever fixedly mounted to an end thereof, and a step defining a second diameter smaller than the first diameter along a length thereof.

The bushing assembly includes a seal, a spacer and a bushing. The spacer can be, for example, a spacer sleeve. The seal is positioned on the shaft abutting the shift lever, the spacer sleeve is positioned on the shaft abutting the seal, and the bushing is positioned over the spacer. In embodiments, the spacer is a sleeve and seal is positioned on the shaft abutting the shift lever, the sleeve is positioned on the shaft abutting the seal, and the bushing is positioned over the sleeve.

In embodiments, the sleeve is a single piece member. The sleeve can be formed from a flexible material or a rigid material. The sleeve can also be formed as a single part member or a multi-part member.

The bushing assembly can include a retaining clip positioned on the shaft between the bushing and the step. A retaining clip can be a retaining ring.

In embodiments, the bushing includes an angled bore lead. Alternately, the bushing includes a stepped internal diameter. The bushing compresses the seal ring axially and radially against the shaft and the shift lever. The bushing can include a flange at an outboard end thereof.

The bushing assembly can be configured as a kit for replacing an original equipment (OE) shift shaft bushing. The kit can include a bushing assembly having a seal, a sleeve and a bushing. The kit can also include a retaining clip such as a retaining ring. The sleeve can be a single or multi-part member and can be formed from a flexible or a rigid material. The bushing can include an angled bore lead and a flange at an outboard end thereof.

In another aspect, a method of replacing an original equipment (OE) bushing on a vehicle transmission shift shaft, which shift shaft has a first diameter, a shift lever fixedly mounted to an end thereof, and a step defining a second diameter smaller than the first diameter along a length thereof, includes positioning a seal on the shift shaft abutting the shift lever, positioning a sleeve on the shift shaft inboard of the seal and positioning a bushing on the shift shaft over the sleeve and the seal compressing the seal ring axially and radially against the shaft and the shift lever.

The method can include positioning a retaining clip on the shift shaft inboard of the bushing. In a method, the bushing includes a flange at an outboard end thereof and an angled bore lead at the flange, such that the bushing length creates a preload, maintaining engagement of the seal with the shift shaft and the shift lever, and the flange assists in compressing the seal ring while installing a retaining clip or ring on the shift shaft inboard of the bushing.

Further understanding of the present disclosure can be obtained by reference to the following detailed description in conjunction with the associated drawings, which are described briefly below.

DESCRIPTION OF THE DRAWINGS

An embodiment of a vehicle transmission shift shaft and bushing assembly is disclosed as an example and is not limited by the figures of the accompanying drawings, in which like references may indicate similar elements and in which:

FIGS. 2C-2F are various views showing the shift shaft and prior art bushing and details;

FIGS. 4 and 4A are sectional illustrations of the shift shaft and bushing of FIGS. 3A and 3B, in which FIG. 4A is an enlarged, partial view of the bushing indicated at 4A in FIG. 4;

DETAILED DESCRIPTION

Figure 1:
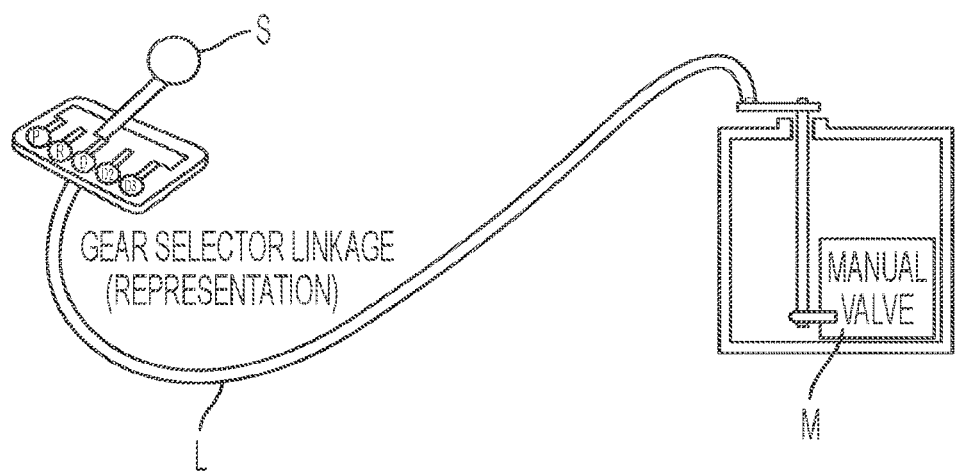
FIG. 1 is an illustration of the gear selector to shift shaft assembly connection.

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Referring now to FIGS. 1 and 3-5, there is shown a vehicle transmission shift shaft assembly 10 in accordance with the present disclosure. The assembly 10 transmits the driver's mechanical input at the gear selector (not shown) to a manual valve (not shown) within the transmission's valve body or casing 12. The shift shaft assembly 10 includes, generally, a shift shaft 14, a bushing assembly 16, and a shift lever 18. The shift lever 18 is attached to an outboard end 20 of the shift shaft 14 by, for example, peening. The shaft 14 has a step 22 that defines an area of reduced diameter 24 at which the bushing assembly 16 is installed. The shift lever 18 is positioned at the outboard end 20 of the shaft 14 with the bushing assembly 16 positioned between the step 22 and shift lever 18. In a typical configuration, the end of the shaft 14 is peened at the shift lever 18 to secure the shift lever 18 to the shaft 14. An opposite end 26 of the shaft 14 has a through-hole 28 to mount to the manual valve M in the transmission casing 12. In this manner, the gear selector S connects to the manual valve M through the gear selector linkage L via the shaft lever 18 and the shift shaft 14. The orientation of the shift lever 18 to the through-hole 28 and manual valve M is critical for proper alignment and shifting of the transmission.

The bushing assembly 16 provides the transition between the interior 30 of the transmission casing 12 and the exterior, as indicated at 32, of the transmission casing 12 through a bore 36 in the transmission casing 12.

Figure 4:
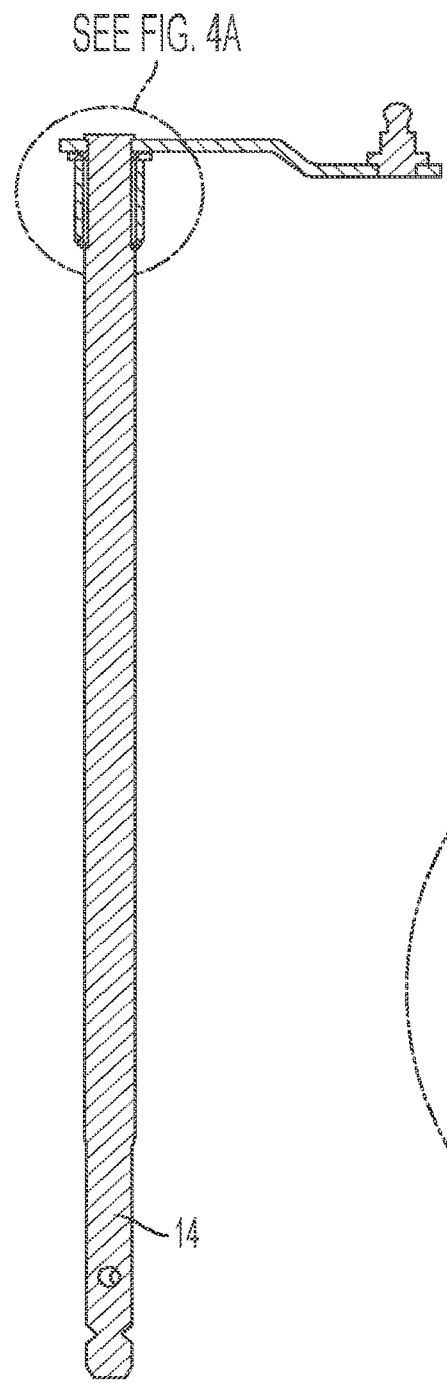
Figure 4A:
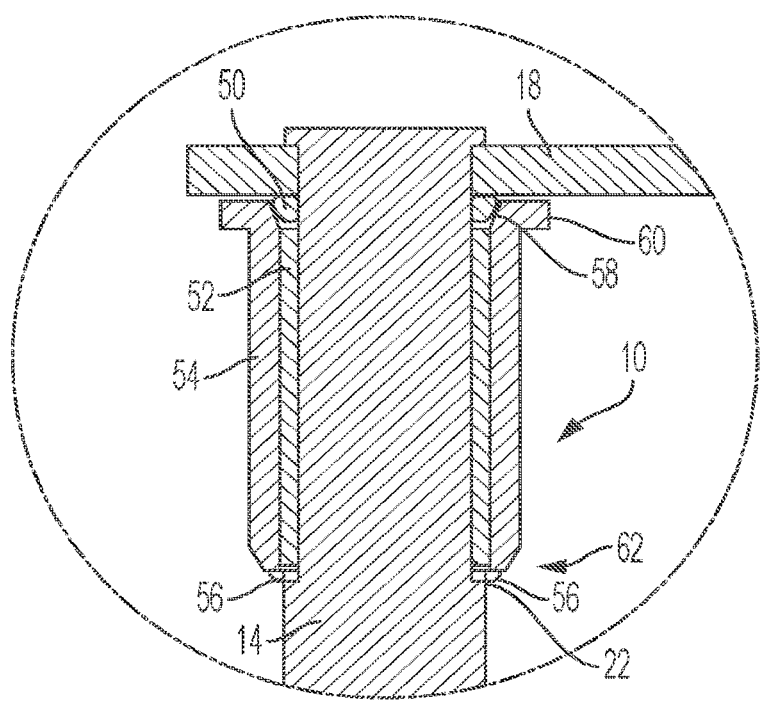
Figure 5:
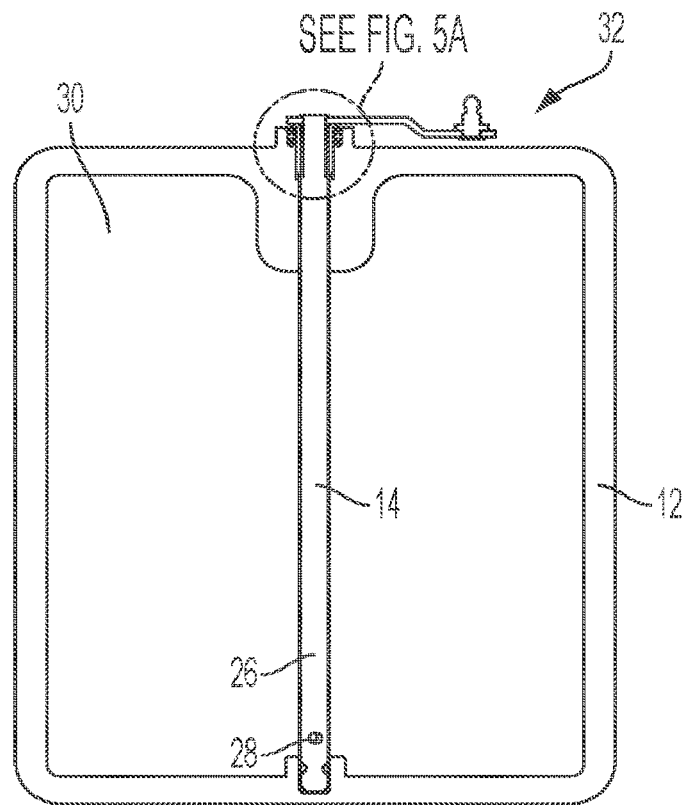
FIGS. 5 and 5A are sectional illustrations of the shift shaft and bushing of FIGS. 3A, 3B, 4 and FIG. 4A as positioned in a transmission casing.
Figure 5A:
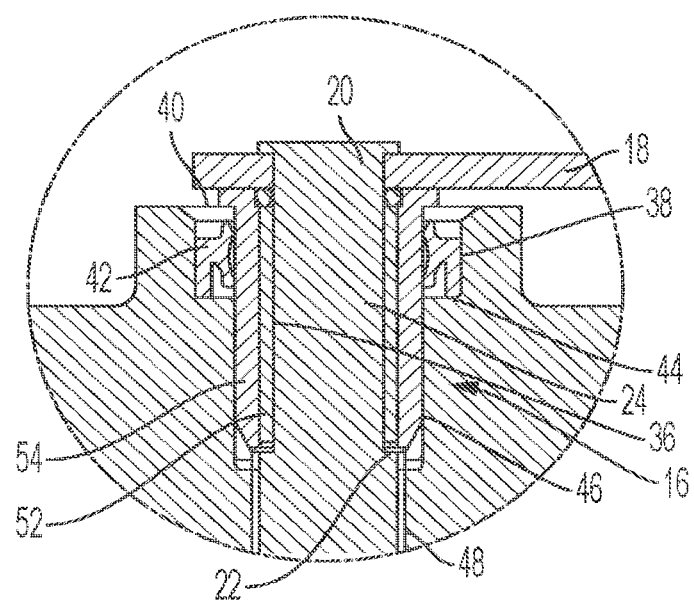

Referring briefly to FIGS. 4 and 4A, the transmission casing 12 includes a two-stepped bore 36 in which the shaft 14 and bushing assembly 16 are received. A first larger step 38, on the outboard side 40 of the bore 36 is configured to receive a double lipped seal 42. The double lipped seal 42 rests against a shoulder 44 between the outboard bore step 38 and a central portion 46 of the bore 36. The shaft 14 then further enters the transmission casing 12 through the inboard portion 48 of the bore 36. The bushing assembly 16 extends into the transmission casing 12 through the entirety of the bore 36 (through all of the portions 38, 46, 48 of the bore 36).

Figure 2A:
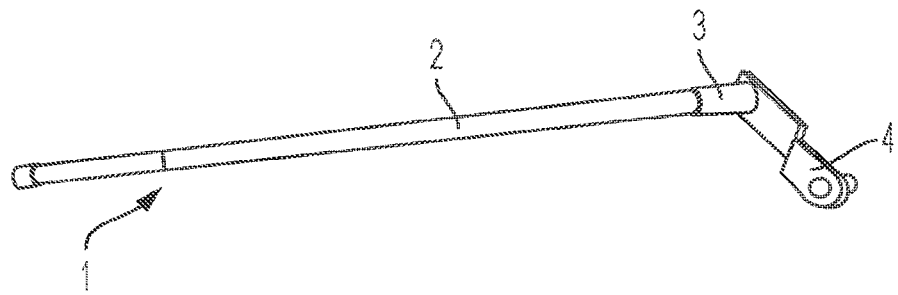
FIGS. 2A and 2B illustrate a shift shaft showing a prior art bushing.
Figure 2B:
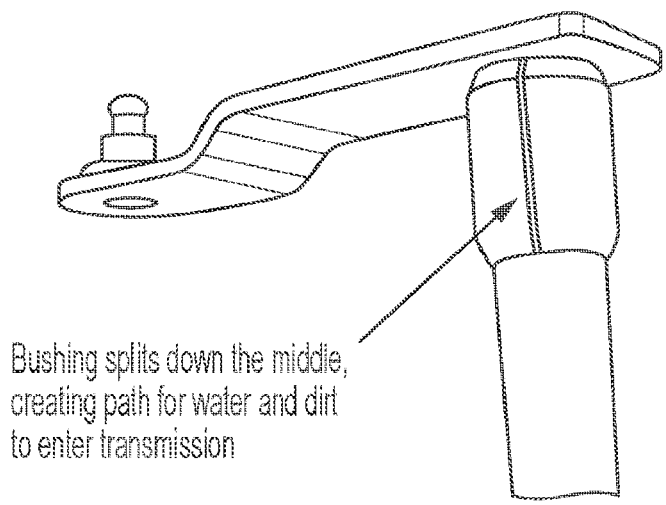
Figure 2G:
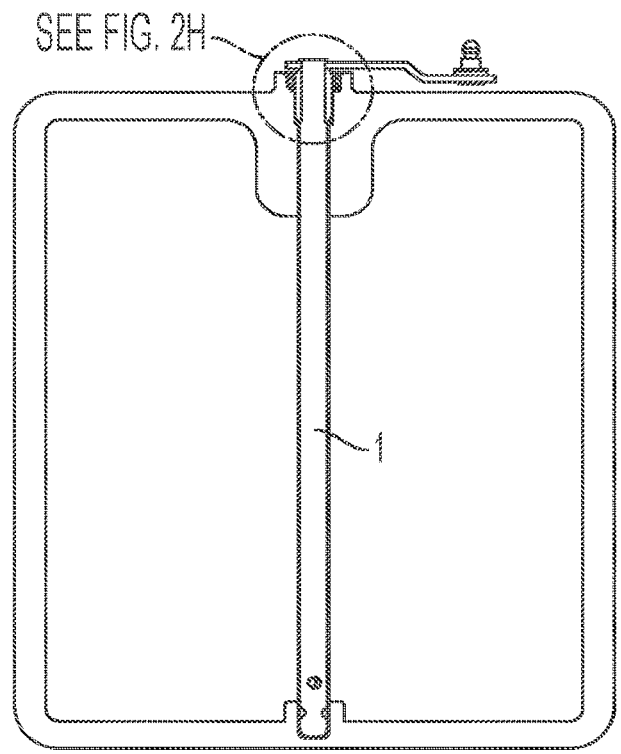
FIGS. 2G and 2H illustrate the shift shaft and prior art bushing installed in a transmission case.
Figure 2H:
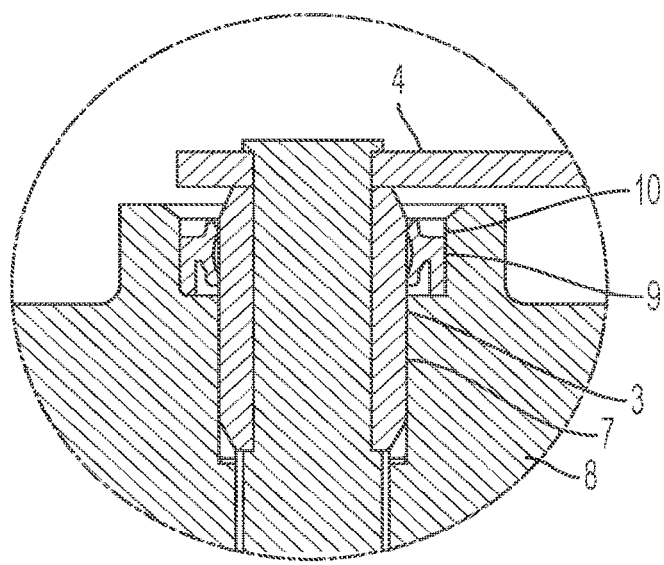
Figures 3A, 3B:
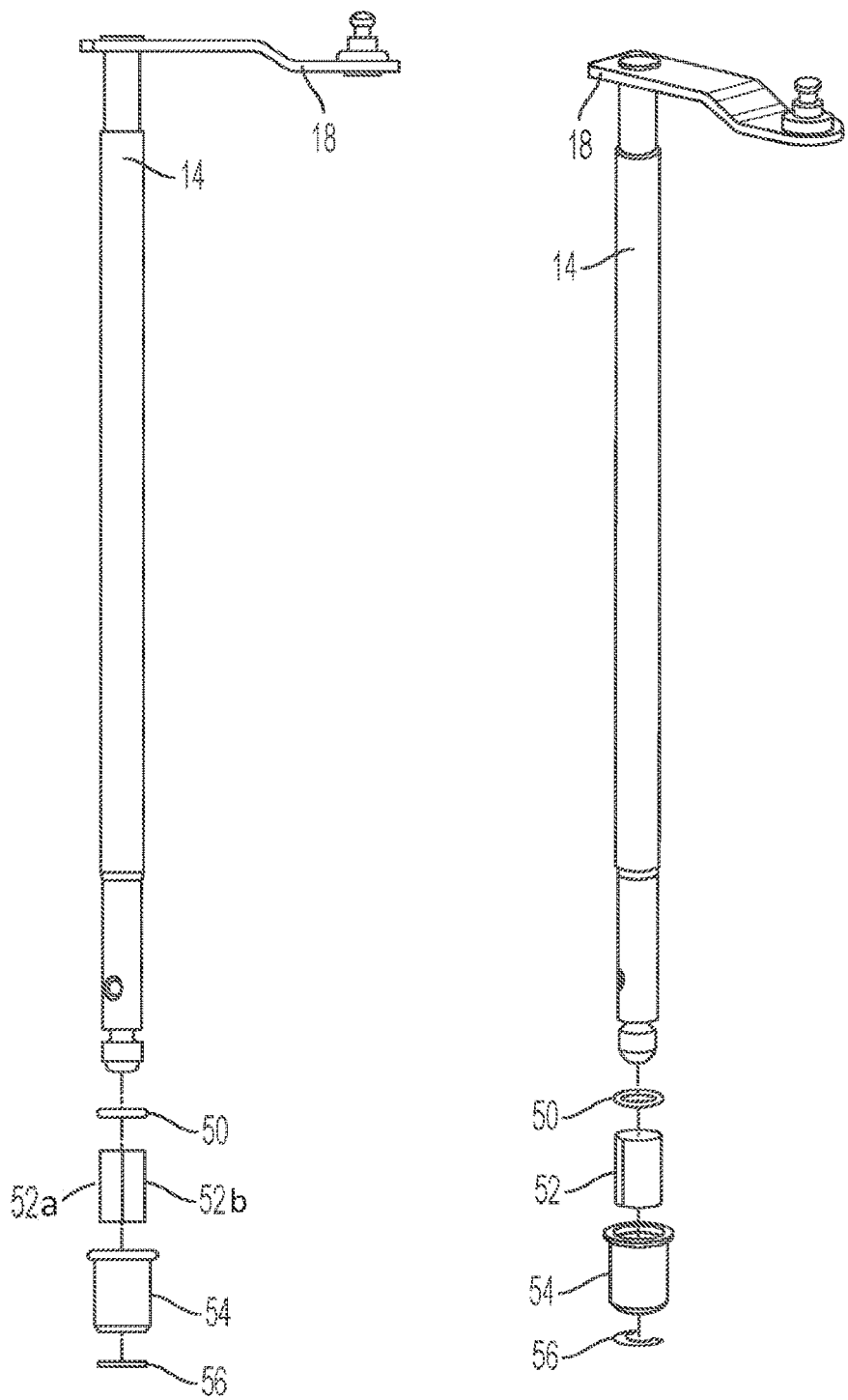
FIGS. 3A and 3B are front and exploded views of a shift shaft illustrating an embodiment of a bushing assembly in accordance with the present disclosure.

FIGS. 2A and 2B are views of the bushing assembly 16, shown exploded relative to the shaft 14. The bushing assembly 16 includes a seal ring 50, a spacer, such as the illustrated spacer sleeve 52, a bushing 54 and can include a retaining ring 56 such as the illustrated retaining clip. In an embodiment, the spacer sleeve 52 is a split sleeve (indicated at 52a, 52b). However, it will be appreciated that the sleeve 52 does not have to be a split sleeve, but can be a one piece member. Other configurations of the sleeve 52 will be understood by those skilled in the art.

In the illustrated embodiment, the seal ring 50 is installed over the shaft 14 and is positioned against the shift lever 18. The spacer sleeve 52 is positioned on shaft 14, adjacent to the seal ring 50. The bushing 54 is installed over the shaft 14 and the spacer sleeve 52 (52a,b), positioned against the seal ring 50. The spacer sleeve serves to take up the space between the reduced diameter of the shaft 14 and the bushing 54. The retaining ring 56 is installed on the shaft 14 between the bushing 54 and the step 22 on the shaft 14 to maintain the bushing assembly 16 (the sleeve 52 (52a,b) and the bushing 54) in place on the shaft 14.

In an embodiment, the spacer sleeve 52 is formed from a material that is sufficiently flexible and can expand so that is can be installed over the larger diameter of the shaft 14, be positioned at the reduced diameter area 24 of the shaft 14, and so that it can be positioned above the step 22 in the shaft 14 (the transition between the shaft diameters). In an alternative embodiment, as noted previously, the spacer sleeve 52 can be a split member and the two spacer parts 52a,b can be positioned on the shaft 14 with the bushing 54 securing the parts 52a,b to the shaft 14. In such an embodiment the spacer parts 52a,b can be, for example, halves and the halves can be, for example, rigid members.

An angled bore lead 58 in the bushing 54 compresses the seal ring 50 axially and radially against the shaft 14 and the shift lever 18. The bushing 54 length creates a preload, maintaining engagement of the seal 50 with the shaft 14 and the shift lever 18. In embodiments, the bushing 54 includes a flange 60 to assist compressing the seal ring 50 while installing the retaining clip 56. The clip 56 is positioned between an inboard end 62 of the bushing 54 and the shaft step 22 to maintain the bushing assembly 16 in place on the shaft 14. In embodiments, as noted above, the retaining clip 56 is a retaining ring.

Figure 6:
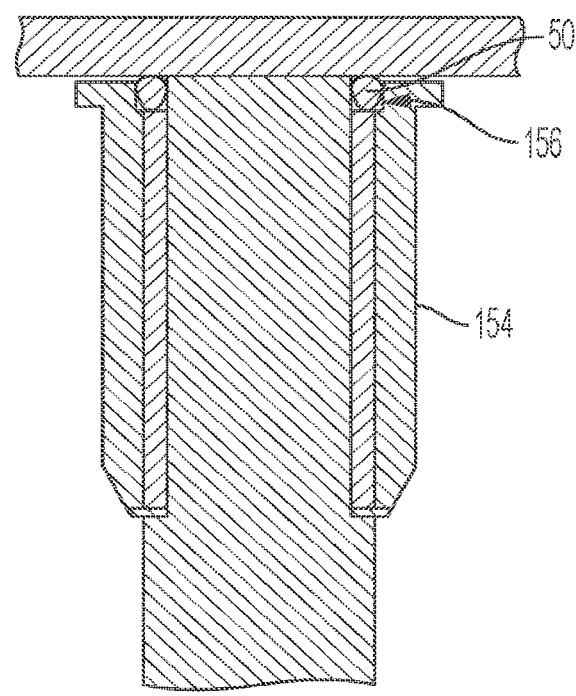
FIG. 6 illustrates an alternate embodiment of a shift shaft bushing.

FIG. 6 illustrates an alternate embodiment of the bushing 154 that includes a stepped internal diameter 156. The seal 50 is received in the stepped internal diameter region 156. In yet another alternate embodiment, one or more seals (not shown) can be used in place of the spacer sleeve 52 (52a,b), or in addition to the spacer sleeve 52 (52a,b), to take up the space between the reduced diameter of the shaft 14 and the bushing 54.

It will be appreciated that the present bushing assembly 16 provides a number of advantages over prior, known shift shaft bushings. For example, the present bushing assembly 16 is readily replaced on a transmission shift shaft 14 without removing the shift lever 18 from the shift shaft 14. This eliminates the potential for misorienting or misaligning the shaft through-hole 28 and the shift lever 18. Moreover the multi-part configuration (separate sleeve 52 (52a,b) and bushing 54) reduces the potential for wear and breakage of the bushing, thus reducing the potential for transmission fluid leakage and moisture/contamination ingress to the transmission casing.

It will also be appreciated that the present bushing assembly 16 can be configured as an original equipment (OE) assembly or it can be configured as a replacement part or replacement kit for existing (OE) transmission shift linkages. In one embodiment, the present bushing assembly 16 is configured as a replacement part kit for Chrysler 62TE automatic transmissions. It will, however, be appreciated that the present bushing assembly 16 can be used in other transmissions.

In an embodiment, the kit is configured for replacing an OE shift shaft bushing. The kit can include a bushing assembly 16 that includes a seal 50, a sleeve 52 (which can be a two-par sleeve 52a,b) and a bushing 54. The sleeve 52 (52a,b) can be, for example, formed from a flexible material. The sleeve can be formed as a multi-part member 52a,b. The sleeve 52 (52a,b) can be formed from a rigid material.

The bushing 54 can include a flange 60 at an outboard end thereof and can include an angled bore lead 58. The kit can also include a retaining clip 56 to secure the bushing assembly 16 to the shift shaft 14.

In an aspect, a method of replacing an OE bushing on a vehicle transmission shift shaft 14, the shift shaft having a first diameter, a shift lever 18 fixedly mounted to an end thereof, and a step 22 defining a second diameter smaller than the first diameter along a length of the shaft 14.

A method can include positioning a seal ring 50 on the shift shaft 14 abutting the shift lever 18, positioning a sleeve 52 (52a,b) on the shift shaft 14 inboard of the seal 50 and positioning a bushing 54 on the shift shaft 14 over the sleeve 52 (52a,b) and the seal 50, compressing the seal ring 50 axially and radially against the shaft 14 and the shift lever 18.

The method can further include positioning a retaining clip 56 on the shift shaft 14 inboard of the bushing 54. The bushing 54 can include a flange 60 at an outboard end thereof and an angled bore lead 58 at the flange 60, such that the bushing 54 length creates a preload, maintaining engagement of the seal 50 with the shift shaft 14 and the shift lever 18. The flange 60 can assist compressing the seal ring 50 while installing a retaining clip or retaining ring 56 on the shift shaft 14 inboard of the bushing 54.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as side(s), upper, lower, top, bottom, rearward, inboard, forward, outboard and the like may be for explanatory purposes only and may not be intended to limit the scope of the disclosure.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

The invention claimed is:

1. A bushing assembly for a vehicle transmission shift shaft, the shift shaft having a first diameter, a shift lever fixedly mounted to an end thereof, and a step defining a second diameter smaller than the first diameter along a length thereof, the bushing assembly comprising:
    a seal;
    a spacer;
    a bushing, wherein the seal, the spacer, and the bushing are configured to be positioned on the shaft such that the seal abuts the shift lever, the spacer abuts the seal, and the bushing is positioned over the spacer; and
    a retainer clip configured to be positioned on the shaft adjacent to the step of the shaft to retain the bushing.

2. The bushing assembly of claim 1, wherein the spacer is a sleeve.

3. The bushing assembly of claim 2, wherein the sleeve is a single piece member.

4. The bushing assembly of claim 2, wherein the sleeve is formed from a flexible material.

5. The bushing assembly of claim 2, wherein the sleeve is a multi-part member.

6. The bushing assembly of claim 5, wherein the sleeve is a multi-part member.

7. The bushing assembly of claim 1, wherein the retaining clip is separate from the bushing and is positioned on the shaft between the bushing and the step.

8. The bushing assembly of claim 1, wherein the retaining clip is a retaining ring.

9. The bushing assembly of claim 1, wherein the bushing includes an angled bore lead.

10. A bushing assembly for a vehicle transmission shift shaft, the shift shaft having a first diameter, a shift lever fixedly mounted to an end thereof, and a step defining a second diameter smaller than the first diameter along a length thereof, the bushing assembly comprising:
    a seal;
    a spacer;
    a bushing, wherein the seal is positioned on the shaft abutting the shift lever, the spacer is positioned on the shaft abutting the seal, and the bushing is positioned over the spacer; and
    wherein the bushing assembly is configured such that when the seal, the spacer, and the bushing are positioned on the shaft, the bushing compresses the seal radially against the shaft and axially against the shift lever.

11. The bushing assembly of claim 1, wherein the bushing includes a flange at an outboard end thereof.

\* \* \* \* \*